(12) United States Patent
Yasukawa et al.

(10) Patent No.: US 7,334,245 B2
(45) Date of Patent: Feb. 19, 2008

(54) OPTICAL DISK APPARATUS

(75) Inventors: Makoto Yasukawa, Kawasaki (JP); Takafumi Tanaka, Kawasaki (JP)

(73) Assignee: Toshiba Samsung Storage Technology Corporation, Kawasaki (JP)

( * ) Notice: Subject to any disclaimer, the term of this patent is extended or adjusted under 35 U.S.C. 154(b) by 366 days.

(21) Appl. No.: 11/084,160

(22) Filed: Mar. 21, 2005

(65) Prior Publication Data

US 2006/0143638 A1 Jun. 29, 2006

(30) Foreign Application Priority Data

Dec. 28, 2004 (JP) ............................. 2004-380927

(51) Int. Cl.
G11B 7/085 (2006.01)

(52) U.S. Cl. ....................................... 720/669

(58) Field of Classification Search ................ 720/669, 720/699, 600, 601; 369/275.4, 244.1, 215.1, 369/275.3, 219.1, 44.37, 44.32, 44.27, 47.1
See application file for complete search history.

(56) References Cited

U.S. PATENT DOCUMENTS

| 5,671,202 | A | | 9/1997 | Brownstein et al. |
| 5,949,744 | A | * | 9/1999 | Lee ........................... 369/44.17 |
| 6,665,255 | B1 | * | 12/2003 | Inoue et al. ................. 720/656 |
| 2005/0007939 | A1 | * | 1/2005 | Kim et al. ............... 369/275.3 |
| 2005/0286359 | A1 | * | 12/2005 | Ezawa et al. ............ 369/44.37 |
| 2007/0081070 | A1 | * | 4/2007 | Wu et al. .................... 347/224 |

FOREIGN PATENT DOCUMENTS

| EP | 1 655 725 A2 | 5/2006 |
| JP | 7-182659 | 7/1995 |
| JP | 10-97730 | 4/1998 |
| JP | 2001-101668 | 4/2001 |
| JP | 2002-56570 | 2/2002 |
| JP | 2003-249041 | 9/2003 |
| JP | 2004-110973 | 4/2004 |
| JP | 2004-152439 | 5/2005 |

\* cited by examiner

Primary Examiner—Allen Cao
(74) Attorney, Agent, or Firm—Oblon, Spivak, McClelland, Maier & Neustadt, P.C.

(57) ABSTRACT

An optical disk drive is provided with an optical pickup and an optical sensor. The optical pickup is used for reading main information from an optical disk. The optical sensor is located in the range of R17 to R23 and used for reading sub information from the optical disk. The optical sensor is provided in relation to the center of a spindle motor used for rotating the optical disk and is located within 120° with respect to the radius that is 180° opposite to the radius along which the optical pickup is movable.

3 Claims, 6 Drawing Sheets

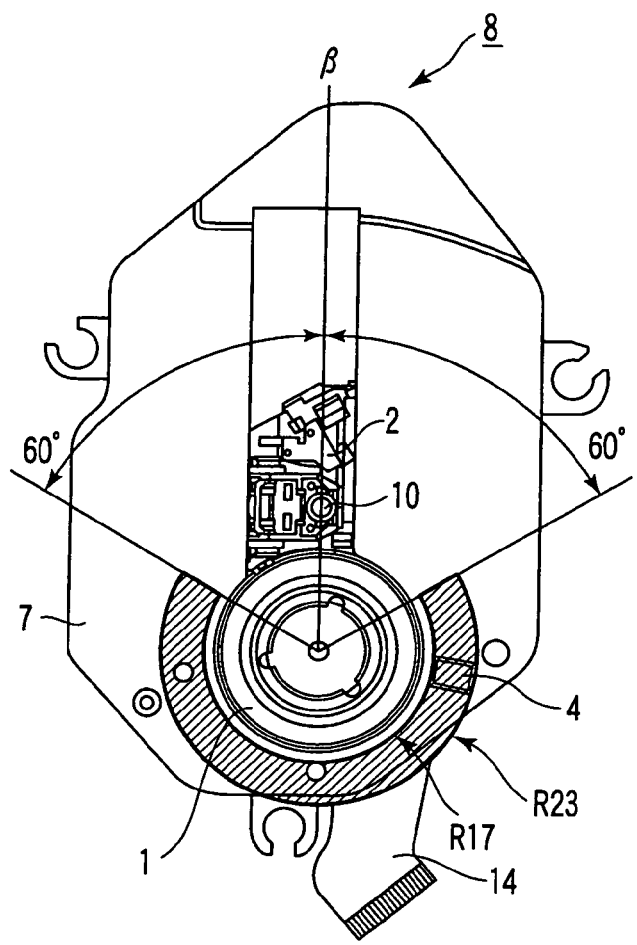
F I G. 6
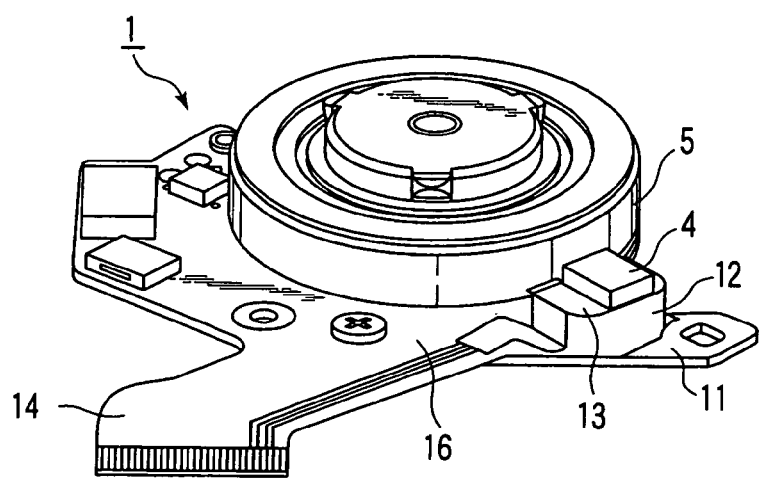
F I G. 7

OPTICAL DISK APPARATUS

CROSS-REFERENCE TO RELATED APPLICATIONS

This application is based upon and claims the benefit of priority from prior Japanese Patent Application No. 2004-380927, filed Dec. 28, 2004, the entire contents of which are incorporated herein by reference.

BACKGROUND OF THE INVENTION

1. Field of the Invention

The present invention relates to an optical disk drive and an information processing apparatus which are adapted for use with an optical disk having a first recording area and a second recording area. The first recording area stores main information, and the second recording area, which is radially inward of the first recording area, stores sub information. The optical disk drive and the information processing apparatus selectively reproduce the main and sub information.

2. Description of the Related Art

In order to read information from an optical disk by use of an optical pickup of an optical disk drive, the laser emitted from the objective lens of the optical pickup must reach every radial position of the disk where information is recorded. Jpn. Pat. Appln. KOKAI Publication No. 2001-101668 discloses an optical disk having an ordinary recording area (main information is recorded in the ordinary recording area) and a special recording area located radially inward of the ordinary recording area (sub information is recorded in the special recording area). Where such an optical disk is used, the optical pickup must emit a laser not only to the ordinary recording area where the main information is recorded but also to the special recording area where the sub information is recorded.

To widen the laser emission range and enable the sub information to be read from the special recording area, the optical pickup and disk rotating motor (spindle motor) used in the prior art have to be changed in shape. However, such an optical pickup and motor are not desirable in light of the space they require, especially in the case of a slim type optical disk drive for a notebook-type personal computer that must not occupy wide space.

BRIEF SUMMARY OF THE INVENTION

An object of the present invention is to provide an optical disk drive and an information processing apparatus which can be suitably used as a slim type without requiring much change to the shapes of the optical pickup and spindle motor they use, and which can read sub information from the special recording area that is radially inward of the ordinary information recording area.

To solve the problems of the prior art, the optical disk drive of the present invention comprises: first read means, movable in the radial direction of a rotating optical disk, for reading main information in a first recording area formed in the optical disk; and second read means, having a fixed read center position which is away from the center of the optical disk by a distance in the range of radius R0 to radius R23, for reading sub information in a second recording area formed in the optical disk, the second read means being provided in relation to the center of the optical disk and being located within 120° with respect to a radius that is 180° opposite to a radius along which the first read means is movable.

The second read means, which is for reading the sub information, is provided independently of the first read means. Owing to this feature, the optical disk drive and information processing apparatus provided in accordance with the present invention can be suitably used as a slim type without requiring much change to the shapes of the optical pickup and spindle motor they use.

In other words, the present invention can provide an optical disk drive and an information processing apparatus which can be suitably used as a slim type, and which can read sub information from the special recording area that is radially inward of the ordinary information recording area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a schematic diagram showing how an optical sensor and other structural elements are arranged in the optical disk drive of the embodiment of the present invention.

FIG. 7 is a perspective view of a spindle motor employed in the embodiment of the present invention.

DETAILED DESCRIPTION OF THE INVENTION

An embodiment of the present invention will now be described with reference to the accompanying drawings.

Figure 1:
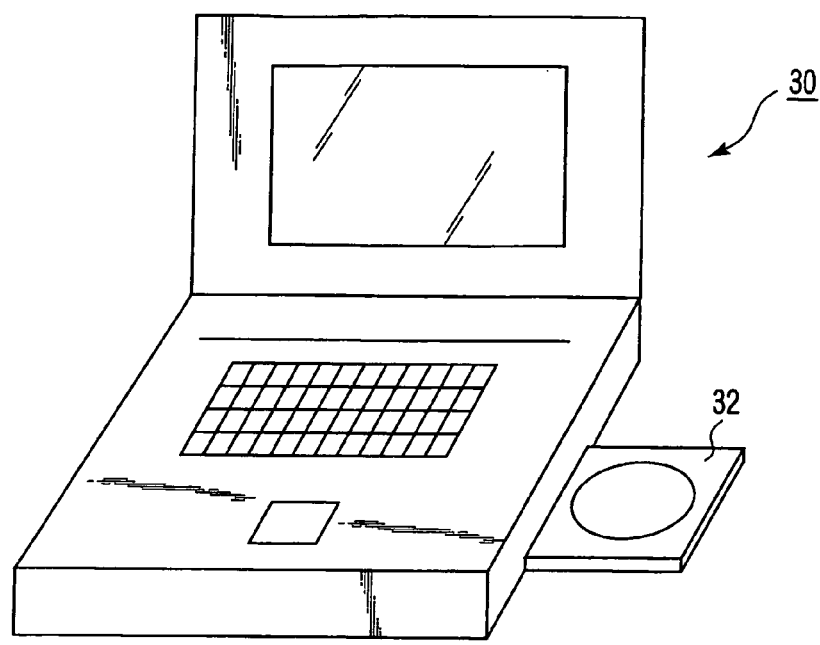
FIG. 1 is a schematic diagram showing a personal computer, which is an information processing apparatus according to an embodiment of the present invention.

FIG. 1 is a schematic diagram showing a personal computer, which is an information processing apparatus according to an embodiment of the present invention. The person computer 30 is provided with a slim type optical disk drive 32 such as a DVD drive. (FIG. 1 shows the state where the tray of the optical disk drive is pulled out.) The personal computer 30 comprises a semiconductor memory and a hard disk drive capable of storing information which is to be recorded in an optical disk by means of the optical disk drive 32 or which is to be reproduced from the optical disk by means of the optical disk drive 32. The personal computer 30 also comprises a CPU which generates instructions for data recording and data reproducing by the optical disk drive 32 and which processes information recording to and reproduced from an optical disk. The personal computer 30 can selectively process the main information and sub information of the optical disk at a time or at different times.

Figure 2:
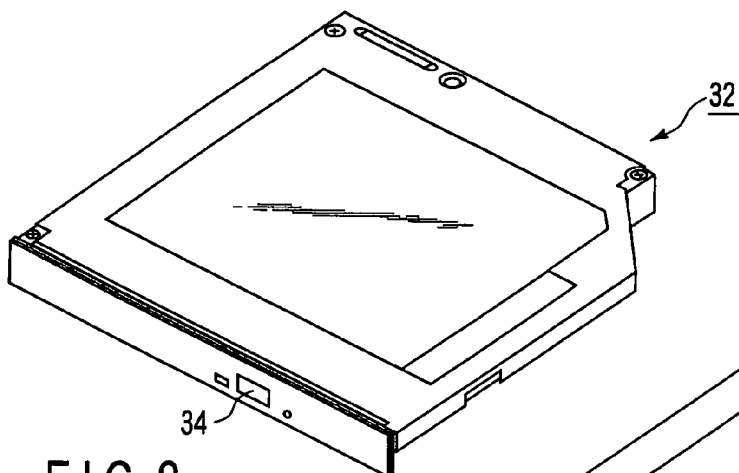
FIG. 2 is a schematic diagram showing an optical drive, which is employed in the embodiment of the present invention.
Figure 3:
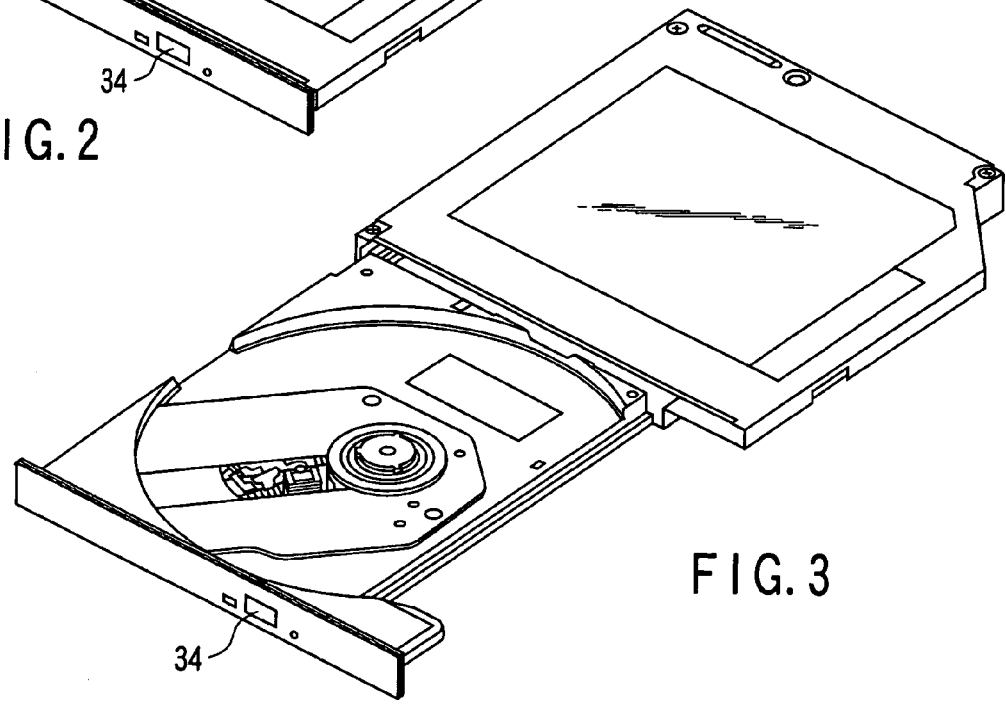
FIG. 3 is a schematic diagram showing a state where a drawer section is pulled out of the optical drive of the embodiment of the present invention.

As shown in FIG. 2, the optical disk drive 32 is provided with an eject button 34. When the eject button 34 is pushed, the drawer section is drawn out, as shown in FIG. 3.

Figure 4:
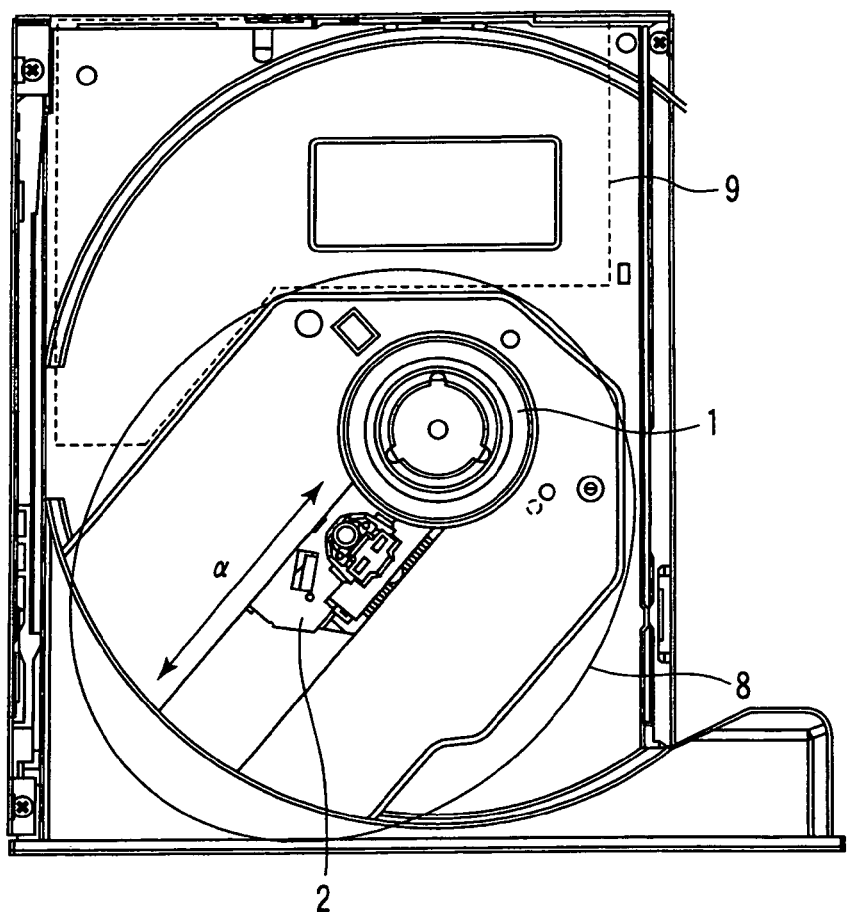
FIG. 4 is a schematic diagram of the drawer section of the optical drive of the embodiment of the present invention.

As shown in FIG. 4, the drawer section comprises a driving circuit board 9 (indicated by the broken lines) and a mechanism unit 8 (indicated by the ellipse). The mechanism unit 8 includes an optical pickup head (PUH) 2. The optical pickup 2 is driven in the α direction. The α direction is a radial direction of the disk, and a disk rotating motor (i.e., a spindle motor) 1 is at the center of the radial direction.

Figure 5:
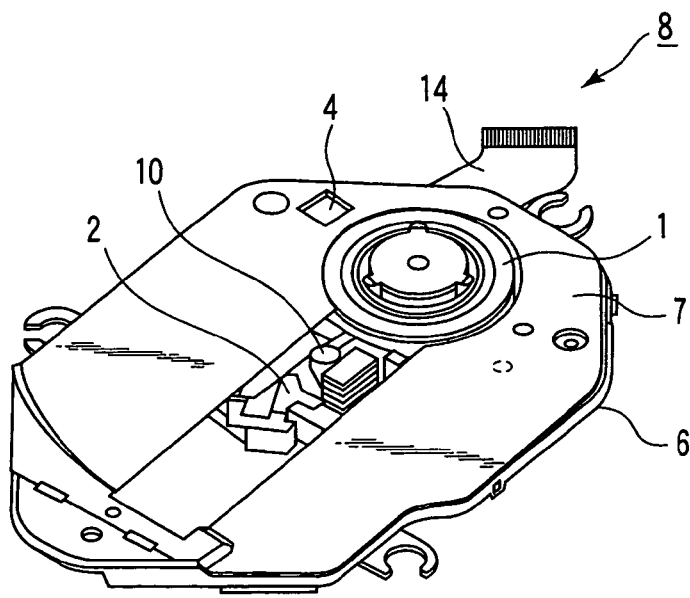
FIG. 5 is a schematic diagram showing a mechanism unit employed in the optical drive of the embodiment of the present invention.

As shown in FIG. 5, the mechanism unit 8 comprises the spindle motor 1 and optical pickup 2 described above. The mechanism unit 8 also comprises: an optical sensor 4 configured to read specific information from the radially internal portion of the optical disk (the optical sensor 4 corresponds to the second read means of the present invention); a chassis 6 configured to hold the optical pickup 2 and a mechanism for driving the optical pickup 2; a cover member 7 for covering these mechanism portions; and an objective lens 10 provided for the optical pickup 2 to emit a reading laser. The mechanism unit 8 is connected to predetermined portions of the optical disk drive 32 by means of a flexible cable (FPC) 14.

The cover member 7 has an opening at the position corresponding to the optical sensor 4, so that the cover member 7 does not affect the function of the optical sensor 4. Since the opening is as small as possible, it does not affect the mechanical strength of the cover member 7.

A description will now be given of the optical sensor 4 (which is unique to the present invention) with reference to FIG. 6. FIG. 6 is a plan view showing the reverse side of the mechanism unit 8 (i.e., the side reverse to that shown in FIG. 5).

The plan view in FIG. 6 is depicted using the center of the spindle motor as a reference. In FIG. 6, the radial direction of the optical disk is indicated as line β connecting between the center of the spindle motor 1 and the center of the objective lens 10 of the optical pickup 2. The optical sensor 4 is arranged in the regions (indicated by the oblique lines) other than the region which is on the right and left sides of radius line β and which is within 60° with respect to that radius line β (i.e., the region of 120° in total). In other words, the optical sensor 4 is arranged in the region which is on the right and left sides of the opposite line that is 180° opposite to radius line β, which is within 120° with respect to that opposite line β, and which is in the range of radii R17-R23 with respect to the center of the spindle motor 1. Arranged in the region indicated by the oblique lines, the optical sensor 2 is not interfered with by the laser emitted from the optical pickup 2. In addition, since the optical sensor 2 is within the range of radii R17-R23, even the specific information recorded in the internal area of the optical disk (i.e., the area radially internal of the ordinary information recording area of the disk) can be read out in most cases. The specific information in the internal area of the optical disk is the information which could be recorded in the transparent portion of an ordinary type of optical disk. The specific information includes: (i) control information used for controlling the recording/reproducing operation performed for the optical disk; (ii) additional information representing the kinds and contents of main information; and (iii) various types of other sub information. In the present embodiment of the invention, the optical sensor 4 is arranged in the regions other than the region which is on the right and left sides of radius line β and which is within 60° with respect to that radius line β (i.e., the region of 120° in total). If the optical sensor 4 is arranged within the ranges of 90° to 160° with respect to radius line β, it is sufficiently away from the optical pickup 2. Since, in this case, the optical sensor 4 and the optical pickup 2 do not interfere with each other, a stable and reliable operation is ensured.

As shown in FIG. 7, the attaching mechanism of the spindle motor 1 includes: a driving circuit board 16; a flexible cable 14 that connects the driving circuit board 16 to the circuit system of the optical disk drive 32; a spacer member 12 permitting the optical sensor 4 to be located at a desirable level; another flexible cable 13 arranged on the spacer member 12 and connecting the optical sensor 4 and the driving circuit board 16 together; and an attachment board 11 of the spindle motor 1.

In other words, the optical sensor 4 is arranged on the flexible cable 13, and the resultant structure is fixed to the spacer member 12 at the predetermined position. The spacer member 12 is fixed to the attachment board 11 of the spindle motor 1 by means of screws or the like in such a manner that the optical sensor 4 is positioned and located at the height level where the information in the optical disk can be sensed. The flexible cable 13 is connected to either the driving circuit board 16 of the spindle motor 1 or the flexible cable 14 by soldering or in a desirable way. The optical sensor 4 operates based on the power supplied thereto through the flexible cable 13.

Figure 8:
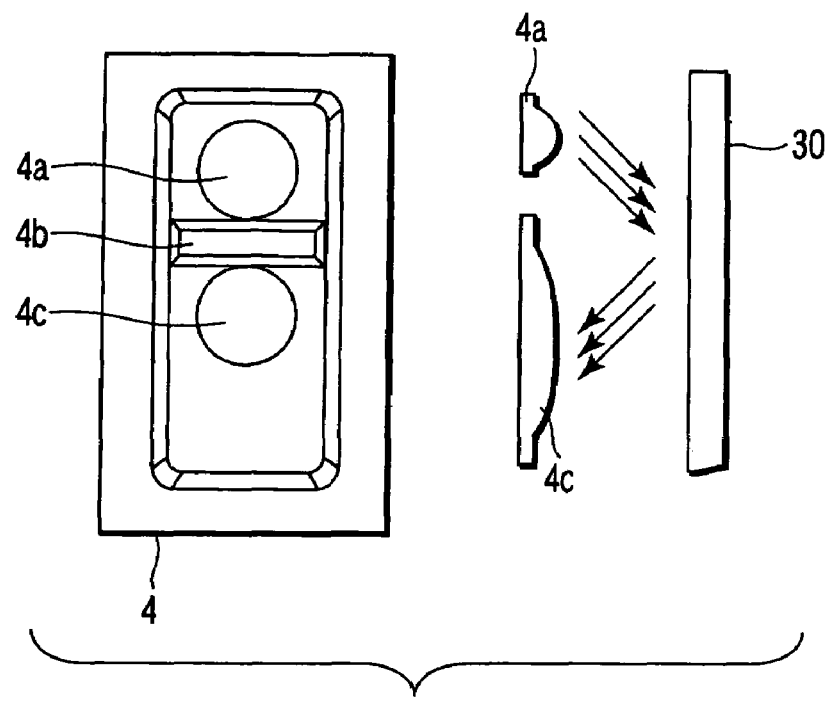
FIG. 8 is a schematic diagram illustrating the optical sensor employed in the embodiment of the present invention.

As shown in FIG. 8, the optical sensor 4 includes a light emitting portion 4a, a light receiving portion 4c, and an isolation portion 4b provided between the light emitting portion 4a and the light receiving portion 4c to prevent optical interference. The light emitted from the light emitting portion 4a is reflected by the optical disk 30 and is then incident on the light receiving portion 4c. The light emitting portion 4a and the light receiving portion 4c of the optical sensor 4 may be integrally provided in one piece.

In the embodiment shown in FIG. 7, the flexible cable 13 on which the optical sensor 4 is arranged is provided independently of the driving circuit board 16 of the spindle motor 1 or the flexible cable 14. These structural elements may be integrally provided in one piece. This integral structure is advantageous in terms of the cost and the number of manufacturing steps required.

Figure 9:
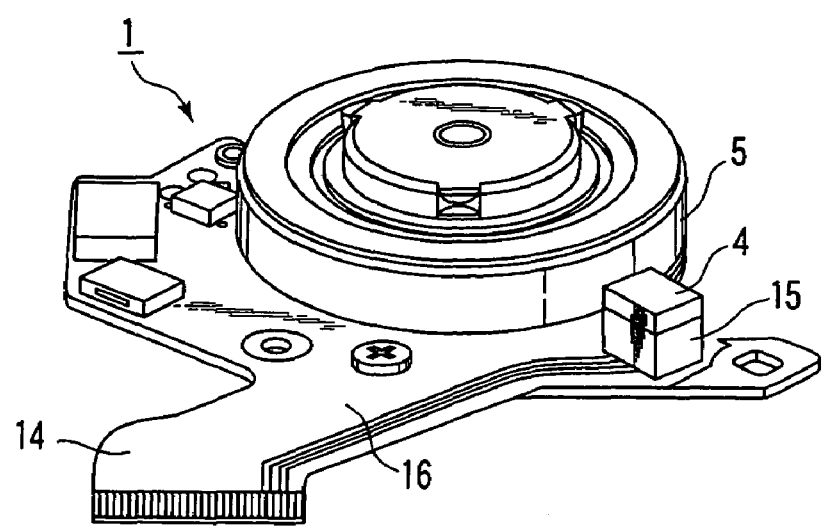
FIG. 9 is a perspective view of the optical sensor employed in another embodiment of the present invention.

FIG. 9 shows another embodiment of the present invention. In this alternative embodiment, a base member 15 is used in place of the flexible cable 13 on which the optical sensor 4 is arranged in the foregoing embodiment. The base member 15 enables the optical sensor 4 to be located at such a height level as enables sensing information. The base member 15 is attached to either the driving circuit board 16 or the flexible cable 14. The optical sensor 4 operates based on the power supplied thereto through the base member 15. By adopting this structure, the flexible cable 13 is not required, and the optical sensor 4 is applied with power through the base member 15. Accordingly, the number of manufacturing steps and the number of structural elements can be reduced.

A structure described below is conceivable as a further embodiment of the present invention. In the foregoing embodiment, the optical sensor 4 is provided for the spindle motor 1. Instead of this structure, a base member or a flexible cable provided with an optical sensor 4 may be attached to a chassis 6, which is a structural element of a mechanism unit 8. The optical sensor 4 is allowed to operate by connecting the resultant structure to the driving circuit or flexible cable of the spindle motor 1, or to the driving circuit of the optical disk drive. The structure wherein the optical sensor 4 is provided for the chassis 6 will be described with reference to FIGS. 10-13. As for the detailed structure of the chassis 6, FIG. 5 should be referred to.

Figure 10:
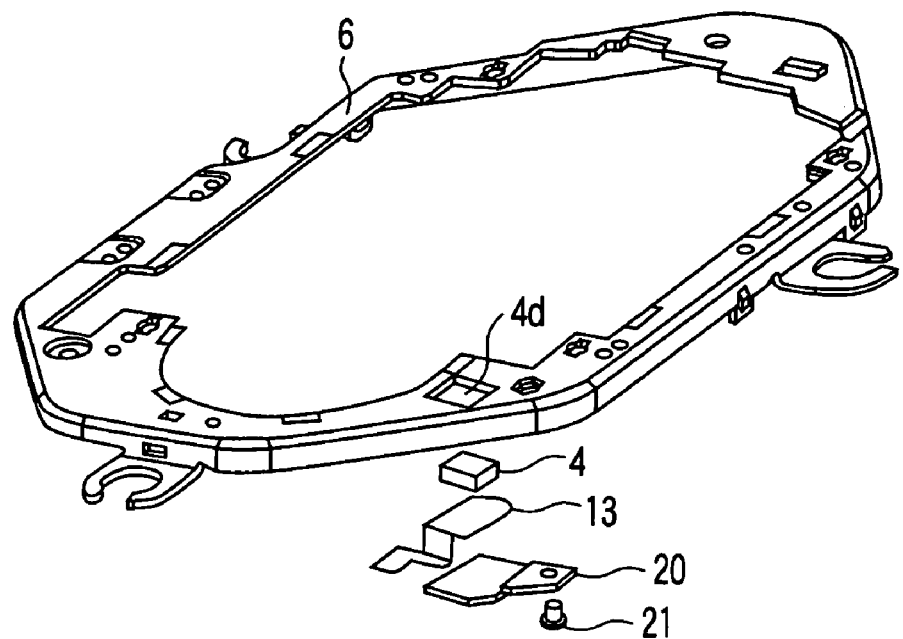
FIGS. 10-13 are perspective views illustrating how an optical sensor employed in the second embodiment is provided for a chassis.
Figure 11:
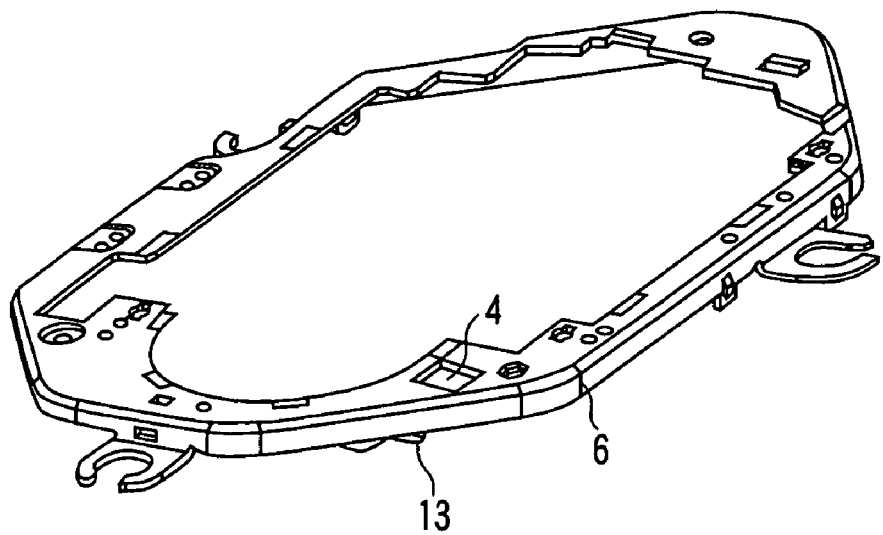
Figure 12:
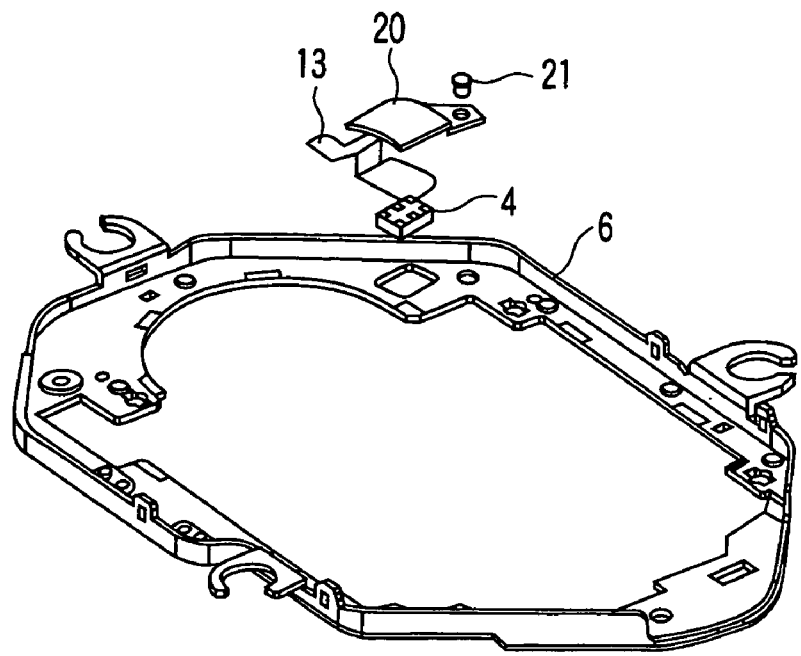
Figure 13:
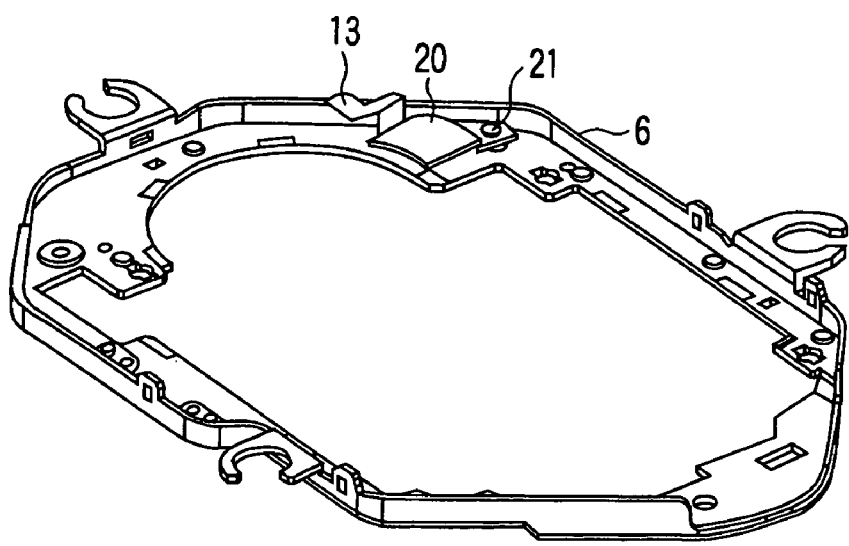

As shown in FIG. 10, a chassis 6 having an optical sensor hole 4d is prepared, and an optical sensor 4, a flexible cable 13, a fixing plate 20 and a fixing screw 21 are assembled with reference to the optical sensor hole 4d of the chassis 6 in the order mentioned. FIG. 12 is a perspective view showing the reverse side of the chassis 6. FIG. 11 shows the state where the optical sensor 4, the flexible cable 13, the fixing plate 20 and the fixing screw 21 have been assembled. FIG. 13 is a perspective view showing the reverse side of the chassis 6.

In the embodiments of the present invention described above, an optical sensor is provided independently of an optical pickup so as to read specific information from an optical disk area that is radially inward of the ordinary information recording area of an optical disk. With this structure, the range in which the optical pickup is movable need not be widened, and neither the optical pickup nor the spindle motor has to be modified in shape. Hence, the optical disk drive according to each embodiment is suitable for use as a slim type. In addition, the optical sensor is fixed and located at an optimal position. This contributes to a structure that is simple and space-saving.

Since the optical pickup and the optical sensor are provided independently of each other, the optical sensor can read specific information (sub information) when the optical pickup is reading or recording main information. Even if the reproduction or recording of the main information has to be controlled based on the sub information, the reproduction or recording of the main information need not be interrupted. Real-time control is thus enabled.

The present invention is not limited to the embodiments described above, and the structural elements of the invention can be modified in various ways without departing from the spirit and scope of the invention. In addition, the structural elements described in relation to the above embodiments can be combined in a desirable way, creating another invention. For example, some structural elements may be deleted from one of the embodiments, and structural elements of different embodiments may be combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk apparatus comprising:
   an optical pickup which moves in a radial direction of the rotating optical disk for reading a first recording area formed on the optical disk as main information;
   an optical sensor which is arranged opposite to a second recording region, which is radially inward of the first recording area of the optical disk, and at a portion other than a region formed within 60 degrees of the radius along which the optical pickup moves with reference to the center of the optical disk, the optical sensor being configured to read sub information recorded in the second recording area; and
   a cover member having an opening provided at a position to face light emitted from the optical sensor, wherein
   the optical sensor is provided on an attachment member of a spindle motor which rotates the optical disk, with a spacer member for adjusting height being interposed, and is mounted on a signal transmission member for transmitting signals of the optical sensor.

2. The optical disk apparatus according to claim 1, wherein the signal transmission member is a driving circuit board of the spindle motor.

3. An optical disk apparatus comprising:
   an optical pickup which moves in a radial direction of the rotating optical disk for reading a first recording area formed on the optical disk as main information;
   an optical sensor which is arranged opposite to a second recording region, which is radially inward of the first recording areas of the optical disk, and at a portion other than a region formed within 60 degrees of the radius along which the optical pickup moves with reference to the center of the optical disk, the optical sensor being configured to read sub information recorded in the second recording area; and
   a cover member having an opening provided at a position to face light emitted from the optical sensor, wherein
   the optical sensor is provided on one of an attachment member of a spindle motor which rotates the optical disk and a chassis which holds the optical pickup, and is mounted on a signal transmission member for transmitting signals of the optical sensor.

* * * * *